(12) United States Patent
Hoffmann et al.

(10) Patent No.: US 9,084,257 B2
(45) Date of Patent: Jul. 14, 2015

(54) METHODS AND SYSTEMS FOR ALLOCATING RESOURCES IN A WIRELESS NETWORK

(71) Applicant: The Boeing Company, Seal Beach, CA (US)

(72) Inventors: Ceilidh Hoffmann, Huntington Beach, CA (US); Bruce A. Dike, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 13/775,607

(22) Filed: Feb. 25, 2013

(65) Prior Publication Data

US 2014/0241308 A1     Aug. 28, 2014

(51) Int. Cl.
 *H04W 72/04*     (2009.01)

(52) U.S. Cl.
 CPC ...... *H04W 72/0446* (2013.01); *H04W 72/0453* (2013.01)

(58) Field of Classification Search
 USPC .......... 370/458, 459, 437, 439, 442, 447, 461
 See application file for complete search history.

(56) References Cited

U.S. PATENT DOCUMENTS

| | | | |
|---|---|---|---|
| 5,719,868 A | 2/1998 | Young | |
| 6,317,436 B1 | 11/2001 | Young et al. | |
| 6,331,973 B1 | 12/2001 | Young et al. | |
| 6,487,186 B1 | 11/2002 | Young et al. | |
| 6,574,206 B2 | 6/2003 | Young | |
| 6,600,754 B1 | 7/2003 | Young et al. | |
| 6,791,994 B1 | 9/2004 | Young et al. | |
| 6,810,022 B1 | 10/2004 | Young | |
| 6,885,651 B1 | 4/2005 | Young | |
| 2004/0203811 A1* | 10/2004 | Rudowicz | 455/450 |
| 2009/0111497 A1* | 4/2009 | Bitter et al. | 455/513 |
| 2009/0168797 A1* | 7/2009 | Danielson et al. | 370/458 |
| 2010/0304772 A1* | 12/2010 | Wang et al. | 455/509 |
| 2014/0241308 A1* | 8/2014 | Hoffmann et al. | 370/330 |

FOREIGN PATENT DOCUMENTS

| | | | |
|---|---|---|---|
| WO | 2009055267 A2 | 4/2009 | |
| WO | 2009072088 A2 | 6/2009 | |

OTHER PUBLICATIONS

Combined Search and Examination Report of Application No. GB1402462.4; Jul. 4, 2014; 5 pages.
Great Britain Examination Report for related application GB1402462.4 dated Apr. 9, 2015; 2 pp.

* cited by examiner

*Primary Examiner* — Benjamin H Elliott, IV
(74) *Attorney, Agent, or Firm* — Armstrong Teasdale LLP

(57) ABSTRACT

Methods and systems for allocating resources in a wireless network are described. In one implementation, a wireless network is utilized by at least a first radio and a second radio. The wireless network includes at least a first channel and a second channel. The first channel is partitioned into control slots and data slots and the second channel is partitioned into at least data slots. The method includes transmitting, using the first radio, in a first control slot of the first channel, a first control signal comprising information for data slot negotiation. The method additionally includes concurrently transmitting or receiving, using the first radio, at least one of a first data signal or a second control signal on the second channel.

19 Claims, 10 Drawing Sheets

METHODS AND SYSTEMS FOR ALLOCATING RESOURCES IN A WIRELESS NETWORK

BACKGROUND

The present disclosure relates generally to wireless communication, and more particularly to allocating resources in a wireless network among a plurality of radios.

Conventional wireless radios communicate in either a half-duplex mode or a full-duplex mode. In a half-duplex mode, a single radio channel transmits a communication from a first radio to a second radio during a first time period. The same radio channel transmits a communication from the second radio to the first radio during a second period of time that does not overlap with the first period of time. That is, the first communication device and the second communication device cannot transmit and receive simultaneously. In a full-duplex mode, a first channel is used for transmission of communications from a first radio to a second radio, and a second channel is used for transmission of communications from the second radio to the first radio. Accordingly, both the first radio and the second radio can transmit and receive simultaneously.

In an ad-hoc wireless mesh network, radios can negotiate and reserve channel resources among themselves by exchanging "request" and "grant" messages in a reservation-based resource allocation policy. In a reservation-based resource allocation policy, a channel is divided into control slots and data slots. Channel resource negotiation events take place among control slots, whereas data slots are used for user information communication, for example Internet protocol (IP) data. When a single communication channel is not sufficient for sharing among radios, the radios can all share multiple communication channels. However, conventional ad-hoc radios are half-duplex. Accordingly, two levels of channel resource negotiations must take place when sharing multiple communication channels. Accordingly, as a number of radios in a wireless network increases, the number of available data slots decreases to accommodate additional control slots. As a result, the data throughput of the wireless network diminishes as the number of radios in the wireless network increases.

BRIEF DESCRIPTION

In one aspect, a method for allocating resources in a wireless network is provided. The wireless network is utilized by at least a first radio and a second radio. The wireless network includes at least a first channel and a second channel. The first channel is partitioned into control slots and data slots and the second channel is partitioned into at least data slots. The method includes transmitting, using the first radio, in a first control slot of the first channel, a first control signal comprising information for data slot negotiation. The method additionally includes concurrently transmitting or receiving, using the first radio, at least one of a first data signal or a second control signal on the second channel.

In another aspect, a radio for use as a first radio in a wireless network is provided. The wireless network includes at least the first radio and a second radio. The wireless network further includes at least a first channel and a second channel. The first channel is partitioned into control slots and data slots and the second channel is partitioned into at least data slots. The first radio is configured to transmit, in a first control slot of the first channel, a first control signal comprising information for data slot negotiation. The first radio is further configured to concurrently transmit or receive at least one of a first data signal or a second control signal on the second channel.

In another aspect, a non-transitory computer-readable storage device is provided. The non-transitory computer-readable storage device has computer-executable instructions embodied thereon for facilitating allocation of resources in a wireless network. The wireless network is utilized by at least a first radio and a second radio. The wireless network includes at least a first channel and a second channel. The first channel is partitioned into control slots and data slots and the second channel is partitioned into at least data slots. When executed by the first radio, the computer-executable instructions cause the first radio to transmit in a first control slot of the first channel, a first control signal comprising information for data slot negotiation and concurrently transmit or receive at least one of a first data signal or a second control signal on the second channel.

DETAILED DESCRIPTION

Figure 1:
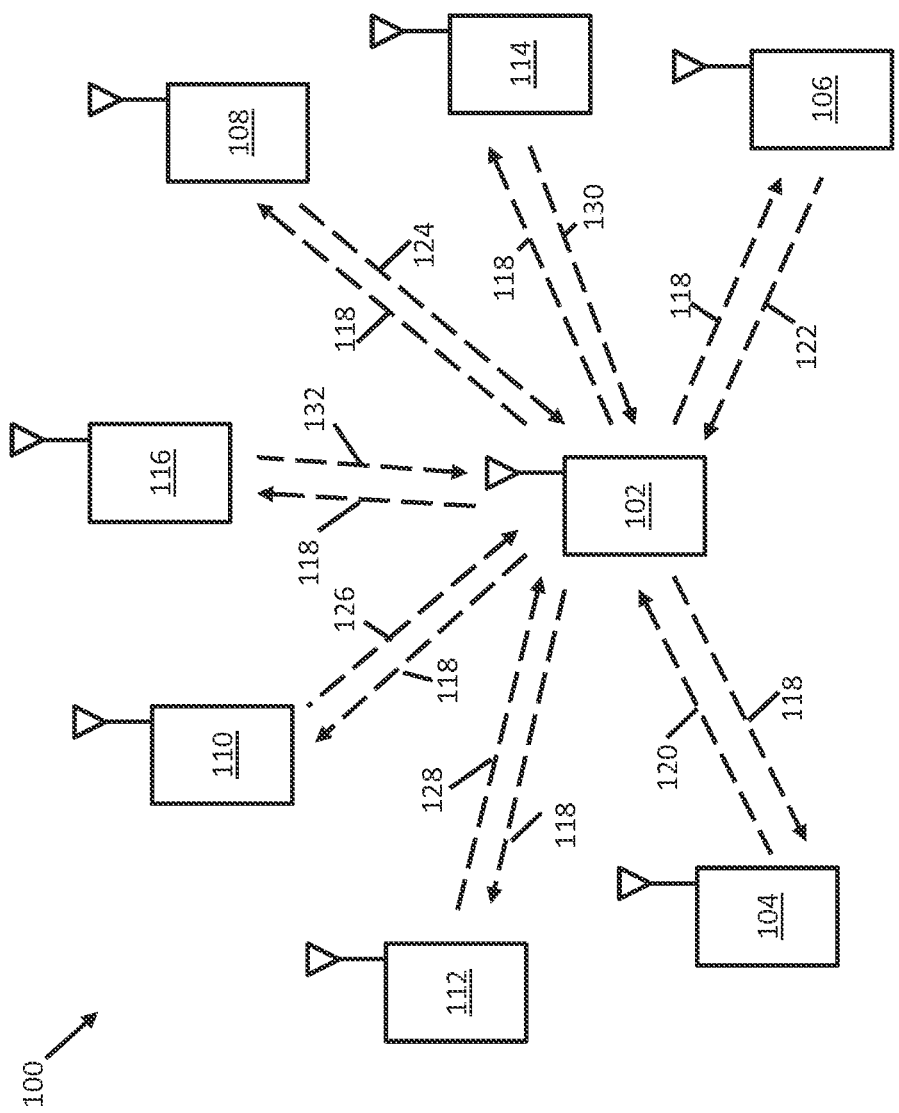
FIG. 1 is a schematic diagram of a multi-channel, full-duplex wireless network among eight radios.

FIG. 1 is a schematic diagram of a multi-channel, full-duplex, ad-hoc wireless mesh network 100 among a first radio 102, a second radio 104, a third radio 106, a fourth radio 108, a fifth radio 110, a sixth radio 112, a seventh radio 114, and an eighth radio 116. As used herein, the term "radio" may refer to any device capable of sending and/or receiving electronic data in the form of a signal, such as a transceiver, or the like. In wireless network 100, first radio 102 transmits on a first radio frequency channel (hereinafter "channel") 118 and receives on a second channel 120, a third channel 122, a fourth channel 124, a fifth channel 126, a sixth channel 128, a seventh channel 130, and an eighth channel 132. All receptions and transmissions may occur simultaneously. That is, first radio 102 is capable of communicating (i.e., transmitting and receiving) on multiple channels at once. Likewise, radios 104, 106, 108, 110, 112, 114, and 116 may also be able to communicate on multiple channels at once.

Network 100 begins with first radio 102 and is subsequently populated with additional radios 104, 106, 108, 110, 112, 114, and 116 as follows. First radio 102 transmits control signals using multiple control slots in a single TDMA frame on first channel 118. Other radios, such as radios 104, 106, 108, 110, 112, 114, and 116 scan for and detect the control slots used by first radio 102. Control signals transmitted in the control slots provide information that is utilized by each of radios 104, 106, 108, 110, 112, 114, and 116 to synchronize with the other radios 102, 104, 106, 108, 110, 112, 114, and 116 in network 100. For example, if there are 64 standard slots in a TDMA frame (not shown), first radio 102 may transmit control signals in control slots numbered, for example, 1, 10, 20, 30, 40, 50, and 60. As more radios 104, 106, 108, 110, 112, 114, and 116 join network 100, a frequency of control signal transmissions of first radio 102 is reduced and the control slots used by first radio 102 are replaced with data slots. Control slots and data slots are described in more detail with reference to FIG. 3.

For multi-channel communication, there are three operational implementations. In a first implementation, radios 102, 104, 106, 108, 110, 112, 114, and 116 are pre-programmed with all available channels. Each channel is defined as a radio frequency ("RF") carrier frequency and an RF bandwidth. In a second implementation, radios 102, 104, 106, 108, 110, 112, 114, and 116 have a cognitive ability to scan an RF spectrum and select a particular channel that is the least noisy. A third implementation is a combination of the first implementation and the second implementation. In the third implementation, radios 102, 104, 106, 108, 110, 112, 114, and 116 tune to pre-selected channels and then migrate to other less noisy channels. In the context of this disclosure, radios 102, 104, 106, 108, 110, 112, 114, and 116 engage in multi-channel communication using channels selected via one of the above-three implementations.

Figure 2:
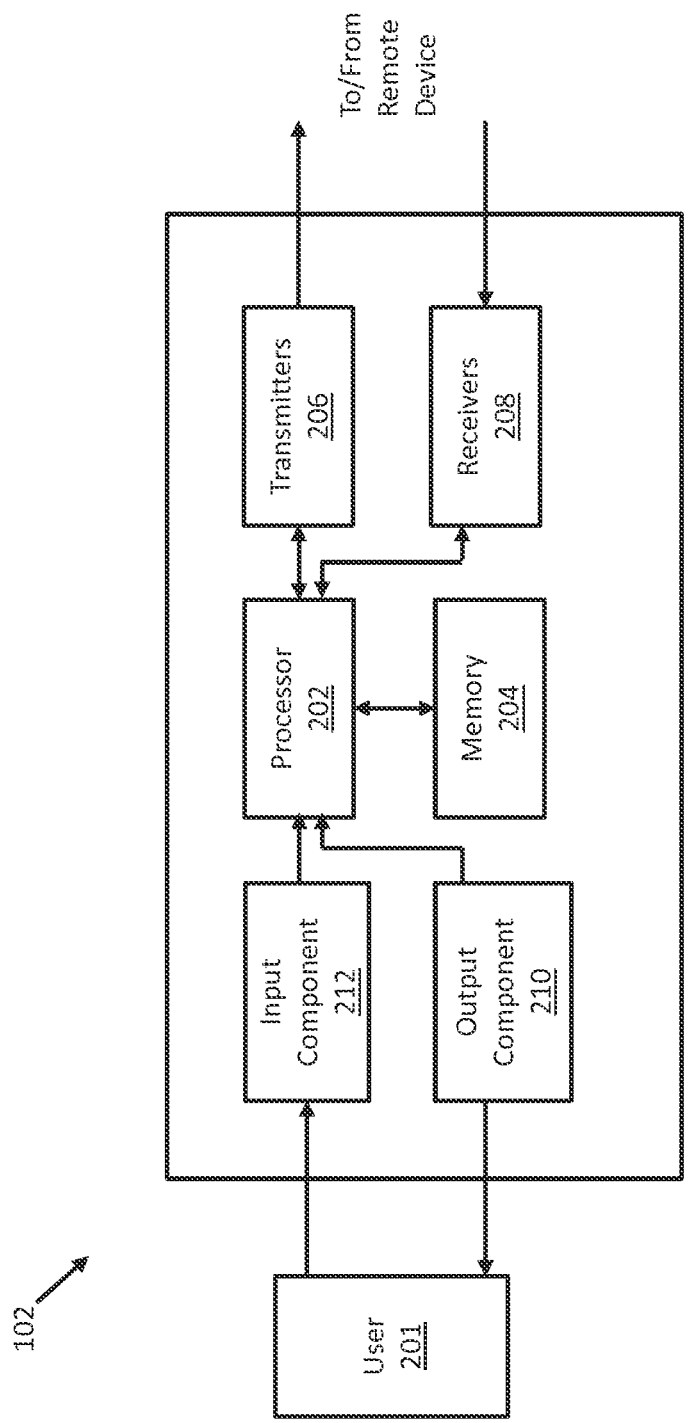
FIG. 2 is a schematic diagram of a radio of FIG. 1.

FIG. 2 is a schematic diagram of first radio 102 of FIG. 1. Radios 104, 106, 108, 110, 112, 114, and 116 may include similar components. In the exemplary implementation, radio 102 includes a processor 202, a memory device 204 coupled to processor 202, one or more wireless transmitters 206, one or more wireless receivers 208, an output component 210, and an input component 212.

Processor 202 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary implementation, memory device 204 includes data and/or instructions that are executable by processor 202 (i.e., processor 202 is programmed by the instructions) to enable processor 202 to perform the functions described herein.

Wireless transmitters 206 are configured to transmit control signals and data signals over wireless network 100 (FIG. 1). In the exemplary implementation, wireless transmitters 206 may transmit in a radio frequency spectrum and operate using a time-division multiple access (TDMA) communication protocol. Each wireless transmitter 206 transmits on a particular radio frequency channel. In other implementations, one or more of wireless transmitters 206 are configured to transmit in a different frequency spectrum and/or communication protocol from others of the transmitters 206.

Wireless receivers 208 are configured to receive control signals and data signals over wireless network 100. In the exemplary implementation, wireless receivers 208 receive in a radio frequency spectrum and operate using a TDMA communication protocol. Each wireless receiver 208 receives on a particular radio frequency channel. In other implementations, one or more of wireless receivers 208 are configured to receive control signals and data signals in a different frequency spectrum and/or communication protocol from others of the receivers 208.

Radio 102 also includes at least one output component 210 for presenting information to a user 201. Output component 210 is any component capable of conveying information to user 201. In some implementations, output component 210 includes an output adapter such as a video adapter and/or an audio adapter or the like. An output adapter is operatively coupled to processor 202 and operatively couplable to an output device such as a display device (e.g., a liquid crystal display (LCD), organic light emitting diode (OLED) display, cathode ray tube (CRT), "electronic ink" display, or the like) or an audio output device (e.g., a speaker or headphones, or the like). In some implementations, at least one such display device and/or audio device is included with output component 210.

Radio 102 includes at least one input component 212 for receiving input from user 201. Input component 212 may include, for example, a keyboard, a pointing device, a mouse, a stylus, a touch sensitive panel (e.g., a touch pad or a touch screen), a gyroscope, an accelerometer, a position detector, an audio input device, or the like. A single component such as a touch screen may function as both an output device of output component 210 and input component 212. In some implementations, output component 210 and/or input component 212 include an adapter for communicating data and/or instructions between radio 102 and a computer connected thereto.

Figure 3:
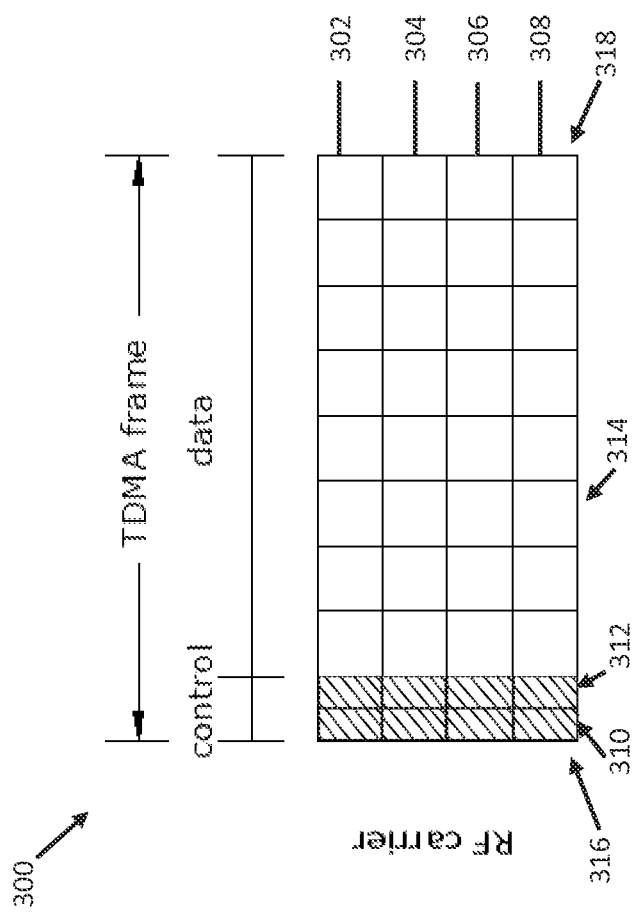
FIG. 3 is a diagram of a multi-channel TDMA frame having control slots assigned concurrently in all channels.

FIG. 3 is a diagram of an implementation of a multi-channel TDMA frame 300 that is used for communication by radios 102, 104, 106, 108, 110, 112, 114, and 116 (FIG. 1) in some implementations. Frame 300 represents a period of time during which control signals, for reserving or negotiating data slots 314, and data signals for transmitting information, are transmitted using corresponding control slots 310 and 312 and data slots 314 by radios 102, 104, 106, 108, 110, 112, 114, and 116. Frame 300 spans a period of time. More specifically, area 316 (i.e., the left portion) of frame 300 is earlier in time as compared to area 318 (i.e., the right portion) of frame 300. Frame 300 includes a first channel 302, a second channel 304, a third channel 306, and a fourth channel 308. Control slots 310 are assigned concurrently in all channels 302, 304, 306, and 308. In respective ones of control slots 310, first radio 102, second radio 104, third radio 106, and fourth radio 108, are simultaneously transmitting and receiving requesting and granting messages ("control signals") in which data slots 314 are reserved for use by radios 102, 104, 106, and 108. In the exemplary implementation, first radio 102 transmits on first channel 302, second radio 104 transmits on second channel 304, third radio 106 transmits on third channel 306, and fourth radio 108 transmits on fourth channel 308 in data slots 314. Given that each radio is capable of simultaneously receiving signals from other channels, each radio can simultaneously receive control signals transmitted from second radio 104, third radio 106, and fourth radio 108.

Subsequently, using control slots 312, fifth radio 110 transmits a control signal on first channel 302, sixth radio 112 transmits a control signal on second channel 304, seventh radio 114 transmits a control signal on third channel 306, and eighth radio 116 transmits a control signal on fourth channel 308 to reserve one or more of data slots 314. As shown, frame 300 corresponds to eight radios and four channels. However, it will be appreciated by those skilled in the art that in other implementations, frame 300 may correspond to more or fewer radios sharing two or more channels.

Figure 4:
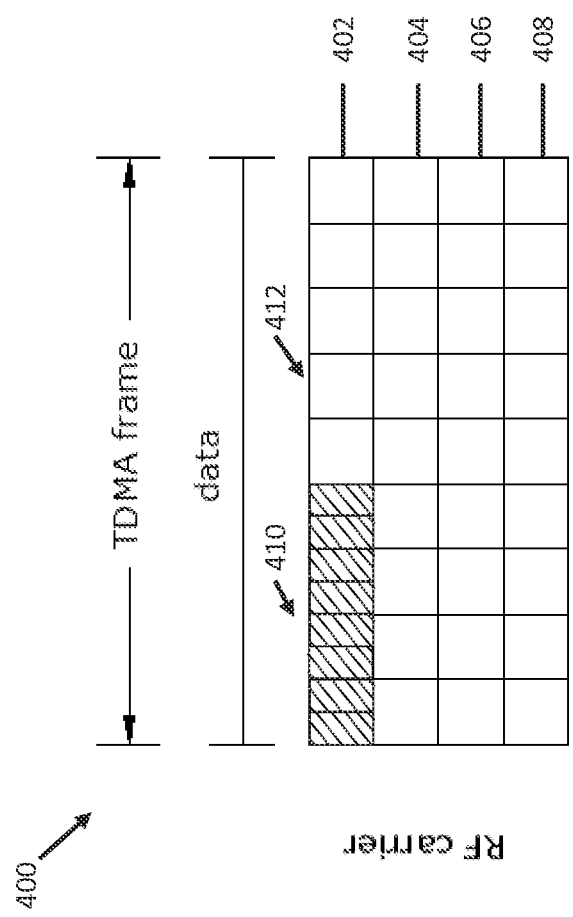
FIG. 4 is a diagram of a multi-channel TDMA frame having control slots assigned sequentially in a single channel.

FIG. 4 is a diagram of a multi-channel TDMA frame 400 that is used for communication by radios 102, 104, 106, 108, 110, 112, 114, and 116 (FIG. 1) in some implementations. Frame 400 includes a first channel 402, a second channel 404, a third channel 406, and a fourth channel 408. Control slots 410 are assigned sequentially in first channel 402. In the exemplary implementation, first radio 102 transmits a control signal on first channel 402 reserving one or more of data slots 412 in any of first channel 402, second channel 404, third channel 406, and fourth channel 408. Subsequently, second radio 104 transmits a control signal on first channel 402 to reserve one or more of data slots 412 in any of first channel 402, second channel 404, third channel 406, and fourth channel 408. Next, each of third radio 106, fourth radio 108, fifth radio 110, sixth radio 112, seventh radio 114, and eighth radio 116 sequentially transmits a control signal on first channel 402 reserving one or more of data slots 412 in any of first channel 402, second channel 404, third channel 406, and fourth channel 408. While radios 102, 104, 106, 108, 110, 112, 114, and 116 transmit control signals in control slots 410, as discussed above, radios 102, 104, 106, 108, 110, 112, 114, and 116 are capable of simultaneously transmitting and receiving data signals in data slots 412 on second channel 404, third channel 406, and fourth channel 408. As shown, frame 400 corresponds to eight radios and four channels, it will be appreciated by those skilled in the art that in other implementations, frame 400 could correspond to more or fewer radios sharing two or more channels.

Figure 5:
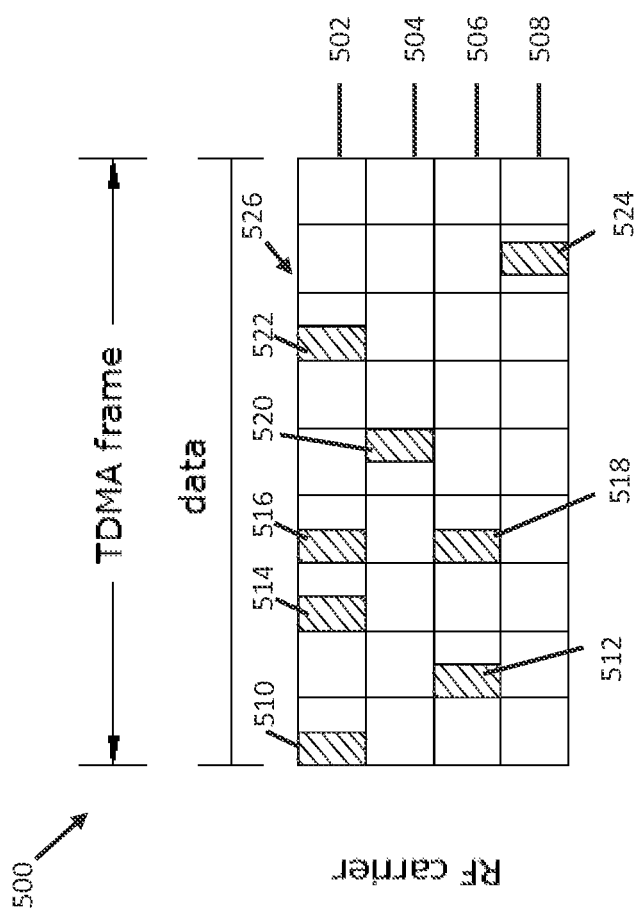
FIG. 5 is a diagram of a multi-channel TDMA frame having locations of control slots and data slots permuted within the frame.

FIG. 5 is a diagram of a multi-channel TDMA frame 500 that is used for communication by radios 102, 104, 106, 108, 110, 112, 114, and 116 (FIG. 1) in some implementations. Frame 500 includes a first channel 502, a second channel 504, a third channel 506, and a fourth channel 508. Locations of control slots 510, 512, 514, 516, 518, 520, 522, and 524 and data slots 526 are permuted within frame 500. Control slot 510, in first channel 502, is used by first radio 102 for data slot negotiation. Subsequently, control slot 512, in third channel 506, is used by second radio 104 for data slot negotiation. Subsequently, control slot 514, in first channel 502, is used by fifth radio 110 for data slot negotiation. Subsequently, control slot 516, in first channel 502, is used by seventh radio 114 for data slot negotiation and control slot 518, in third channel 506, is used by fourth radio 108 for data slot negotiation. Subsequently, data slot 520, in second channel 504, is used by third radio 106 for data slot negotiation. Subsequently, data slot 522, in first channel 502, is used by sixth radio 112 for data slot negotiation. Subsequently, data slot 524, in fourth channel 508, is used by eighth radio 116 for data slot negotiation. Interspersed among control slots 510, 512, 514, 516, 518, 520, 522, and 524 are data slots 526 in which radios 102, 104, 106, 108, 110, 112, 114, and 116 transmit and receive data signals in accordance with the reservation of the data slots 526 by each of radios 102, 104, 106, 108, 110, 112, 114, 116.

Unlike frames 300 (FIG. 3) and 400 (FIG. 4), in which control slots 310, 312, and 410 are contiguous, control slots 510, 512, 514, 516, 518, 520, 522, and 524 in frame 500 are distributed in a pseudo-random pattern. Randomization of the pattern can occur every TDMA frame, or once every multiple TDMA frames. In some implementations, radios 102, 104, 106, 108, 110, 112, 114, and 116 randomize the pattern in accordance with a current time, random seed, and/or preprogrammed sequence shared among radios 102, 104, 106, 108, 110, 112, 114, and 116, as will be appreciated by those skilled in the art. By randomizing the locations of control slots 510, 512, 514, 516, 518, 520, 522, and 524, a possibility of jamming and/or disrupting communications over wireless mesh network 100 is reduced.

Figure 6:
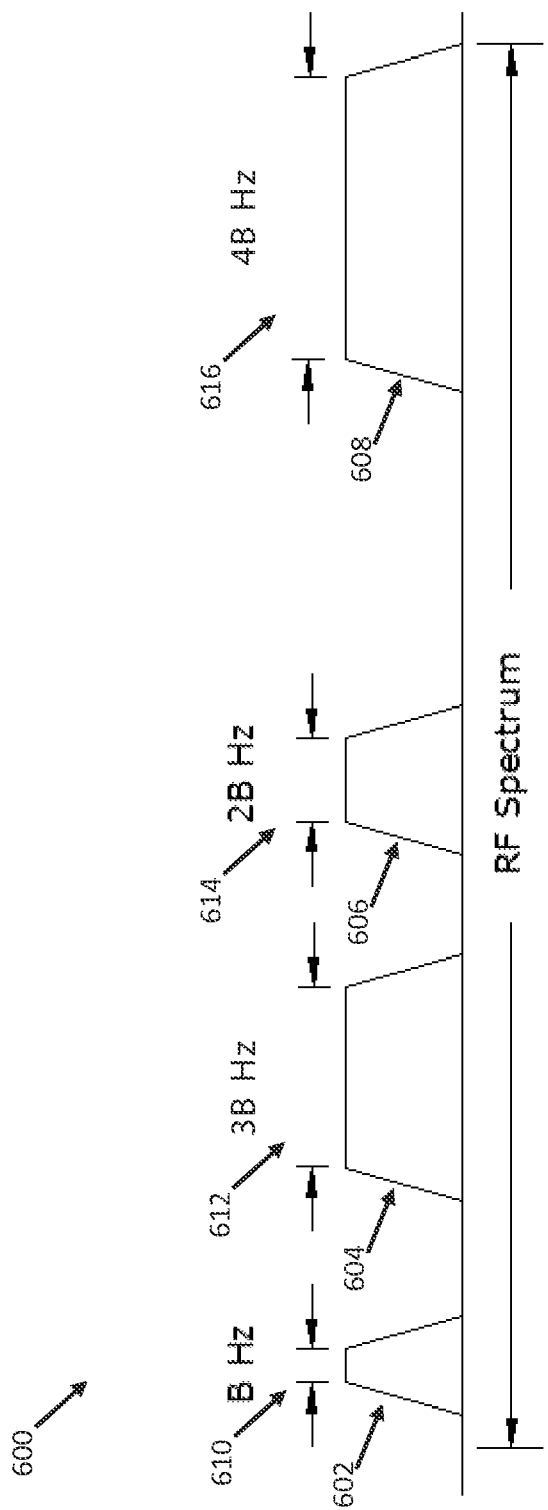
FIG. 6 is a diagram of a radio frequency spectrum including channels of dissimilar bandwidth.

FIG. 6 is a diagram of a radio frequency spectrum 600 with a first channel 602, a second channel 604, a third channel 606, and a fourth channel 608 that are used for communication by radios 102, 104, 106, 108, 110, 112, 114, and 116 (FIG. 1) in some implementations. First channel 602, second channel 604, third channel 606, and fourth channel 608 are non-contiguous. Moreover, channels 602, 604, 606, and 608 have different bandwidths. In the implementation shown, first channel 602 has a first bandwidth 610, whereas second channel 604 has a second bandwidth 612 that is three times as wide as first bandwidth 610. Additionally, third channel 606 has a third bandwidth 614 that is two times as wide as first bandwidth 610 and fourth channel 608 has a fourth bandwidth 616 that is four times as wide as first bandwidth 610. In other implementations, bandwidths 610, 612, 614, and 616 are of other widths and/or are not integer multiples of each other, but rather fractional multiples of each other. Moreover, each of channels 602, 604, 606, and 608 may have a different carrier frequency.

Figure 7:
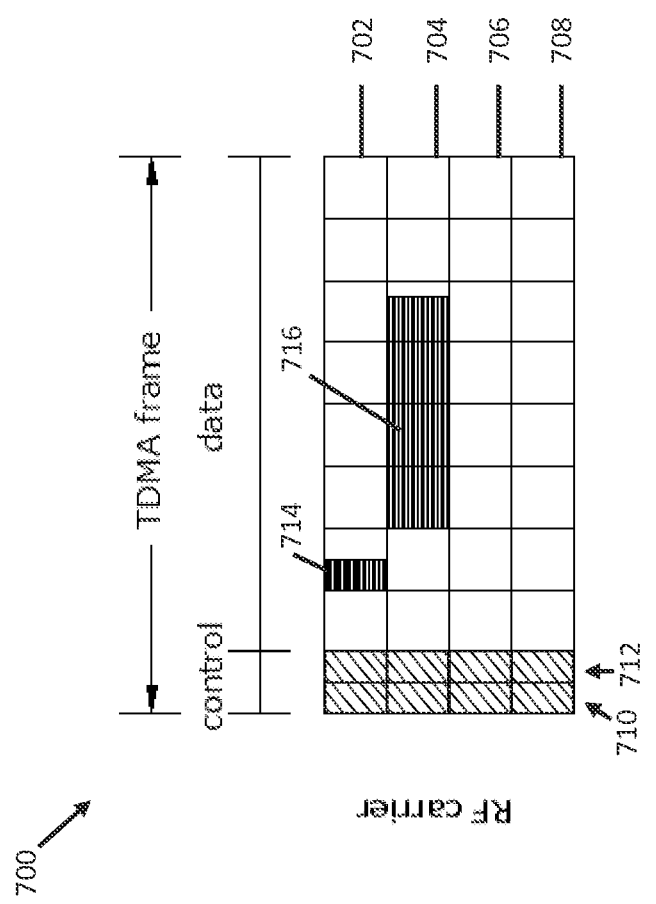
FIG. 7 is a diagram of a multi-channel TDMA frame having data slots with different sizes.

FIG. 7 is a diagram of a multi-channel TDMA frame 700 that is used for communication by radios 102, 104, 106, 108, 110, 112, 114, and 116 (FIG. 1) in some implementations. Frame 700 includes a first channel 702, a second channel 704, a third channel 706, and a fourth channel 708. Additionally, frame 700 includes control slots 710 and 712. Frame 700 includes data slots 714 and 716 which are of different sizes (i.e., time lengths). In this implementation, first data slot 714 has a first size and second data slot 716 has a second size which is different than the first size. In some implementations, data slots are of two varieties: standard-size and variable-size ("super slots"). A standard-size data slot has a fixed size (i.e., time duration) and a variable-size data slot has a size (i.e., time duration) that is a multiple of the fixed size. Both first data slot 714 and second data slot 716 may be variable-size data slots. Data slot 716, which is equivalent in size to multiple contiguous standard-size data slots, is capable of providing increased efficiency in data transmission as compared to a standard size data slot. That is, since a physical-layer header overhead is of fixed duration for each data slot, regardless of whether the data slot is of standard size or variable size, by concatenating contiguous multiple standard-size data slots, the data transmission efficiency may be increased.

Figure 8:
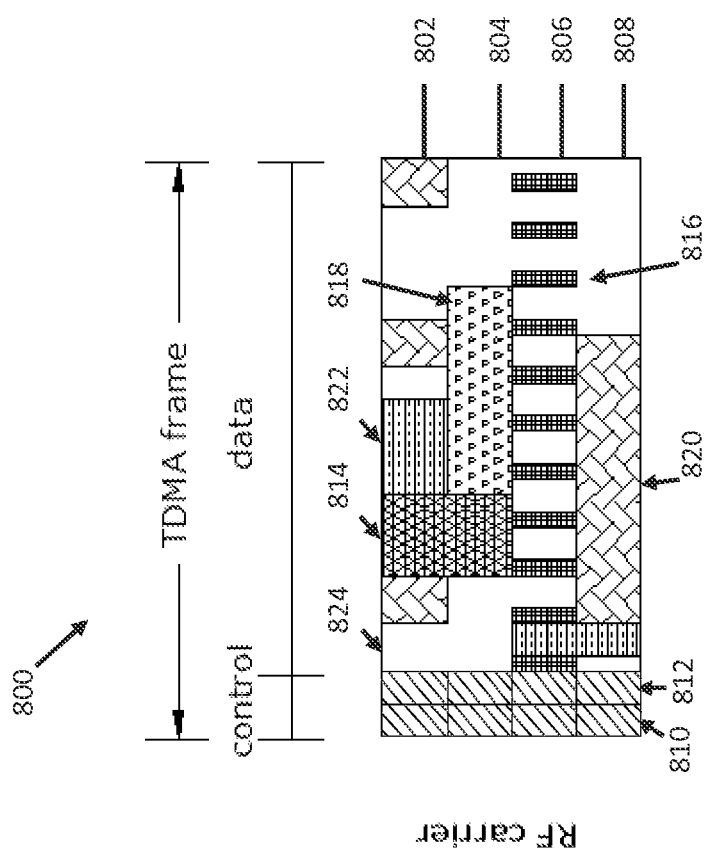
FIG. 8 is a diagram of a multi-channel TDMA frame having data slots reserved by different radios.

FIG. 8 is a diagram of a multi-channel TDMA frame 800 that is used for communication by radios 102, 104, 106, 108, 110, 112, 114, and 116 (FIG. 1) in some implementations. Frame 800 includes a first channel 802, a second channel 804, a third channel 806, and a fourth channel 808. Additionally, frame 800 includes control slots 810 and 812. A first region 814 represents data slots reserved by first radio 102 for transmission of data signals. A second region 816 represents data slots reserved by second radio 104 for transmission of data signals. A third region 818 represents data slots reserved by third radio 106 for transmission of data signals. Additionally, a fourth region 820 represents data slots reserved by fourth radio 108 for transmission of data signals. Further, a fifth region 822 represents data slots reserved by fifth radio 110 for transmission of data signals. A sixth region 824 represents data slots that have not yet been reserved by any of first radio 102, second radio 104, third radio 106, fourth radio 108, and fifth radio 110.

As shown in FIG. 8, standard-size data slots in region 816 have been reserved by second radio 104, whereas first radio 102, third radio 106, fourth radio 108, and fifth radio 110 have reserved variable-size data slots that are multiples of the fixed size (i.e., time duration) of standard-size data slots, as described with reference to FIG. 7. In region 814, first radio 102 has reserved time-overlapping variable-size data slots in first channel 802 and second channel 804. More specifically, first radio 102 is equipped with at least two signal transmission modules (not shown), enabling first radio 102 to transmit data signals over both first channel 802 and second channel 804 simultaneously. Efficiency in data transmission is increased if all data slots in frame 800 are reserved and used for data signal transmission.

Figure 9:
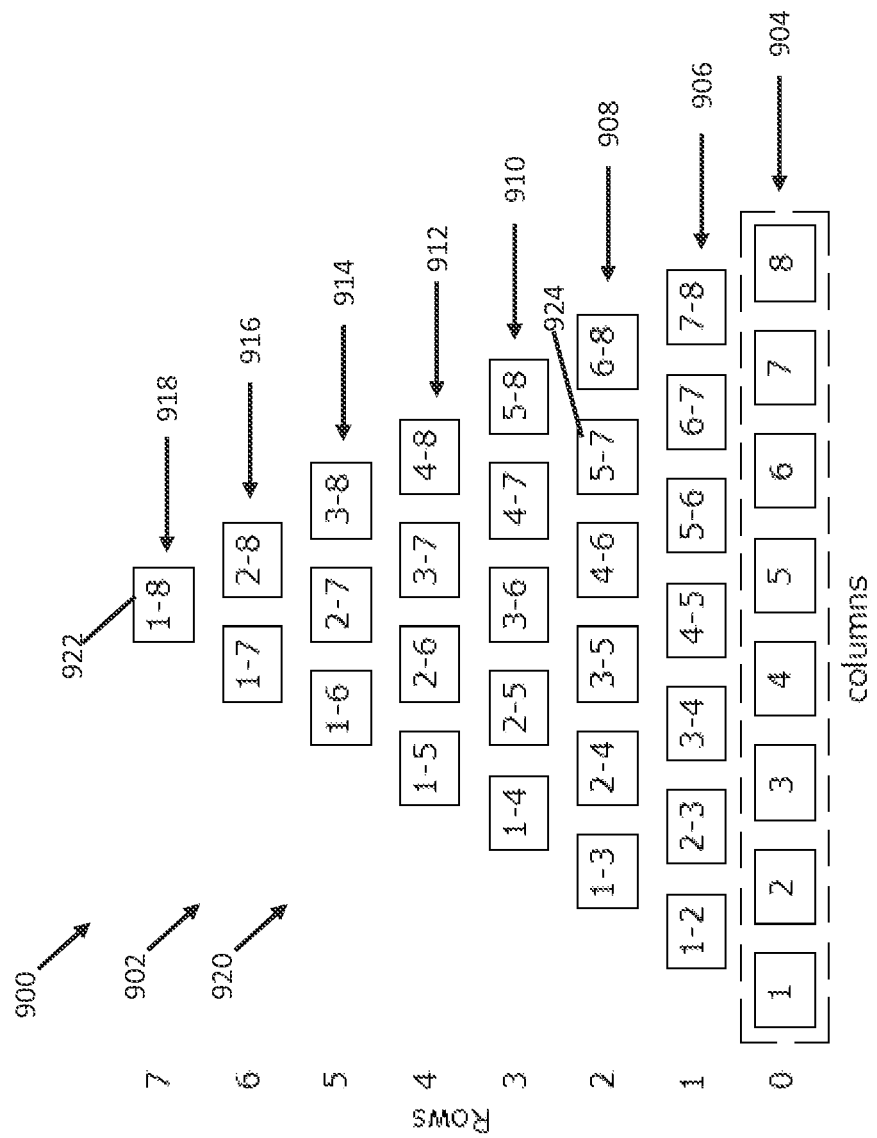
FIG. 9 is a diagram of data slots illustrated as organized leaves in a tree structure.

FIG. 9 is a diagram of tree structure 900 of data slots 902. For purposes of explanation, data slots 902, organized individually and in groups, may be considered leaves 920 in tree structure 900. Tree structure 900 includes a first row 904, a second row 906, a third row 908, a fourth row 910, a fifth row 912, a sixth row 914, a seventh row 916, and an eighth row 918. Each of eight data slots 902 correspond to a leaf 920 in first row 904. In second row 906, each leaf 920 corresponds to a grouping of two contiguous data slots 902. In third row 908, each leaf 920 corresponds to a grouping of three contiguous data slots 902, and so on such that eighth row 918 includes a single leaf 922 that represents eight data slots 902. The groups of data slots 902 represented by leaves 920 in rows 906, 908, 910, 912, 914, and 916 partially overlap such that a total of eight data slots 908 are represented in each row 904, 906, 908, 910, 912, 914, 916, and 918.

In some implementations, radios 102, 104, 106, 108, 110, 112, 114, and 116 use an addressing scheme based on tree structure 900 to reserve data slots 902 in a frame. As described above, reservation of data slots 902 takes place through the transmission of control signals in control slots of a frame. Using tree structure 900, first radio 102, for example, may reserve data slots 902 represented by a fifth leaf in third row 908. Rows 904, 906, 908, 910, 912, 914, 916, and 918 are addressed by a zero-based index in a three-bit number. Accordingly, third row 908 is addressed by the three-bit binary number 010, which corresponds to 2 in decimal. The leaves are also addressed by a zero-based index in a three-bit binary number. Accordingly, the fifth leaf is addressed by the three-bit binary number 100, which corresponds to 4 in decimal. In a frame that includes four channels, a zero-based index with a two-bit binary number is used to address any of the four channels. Accordingly, a first channel is addressed by the zero-based two-bit binary number 00, which corresponds to 0 in decimal.

In the above example, by concatenating the row number 010, the leaf number 100, and the channel number 00, into an eight-bit number 01010000, and transmitting the eight-bit number in a control slot, first radio 102 can reserve leaf 924, corresponding to consecutive data slots 5, 6, and 7 in the first channel of a frame having eight data slots in each channel. Other radios 104, 106, 108, 110, 112, 114, and 116 would reserve other data slots in the same manner. The data slot addressing and reservation scheme described above can be extended for any data slot count of $2^N$, where N is an integer exponent.

Figure 10:
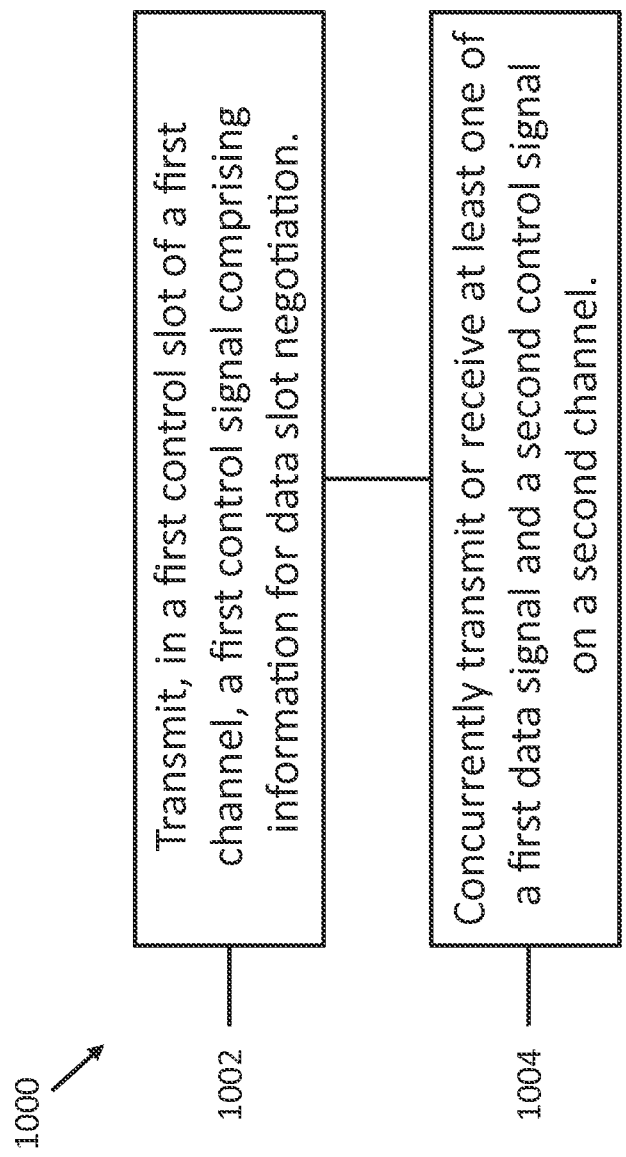
FIG. 10 is a flow diagram of a method for allocating resources in a wireless network.

FIG. 10 is a flow chart of a method 1000 for allocating resources (i.e., data slots in TDMA frames) in wireless network 100 (FIG. 1). Method 1000 is implemented by a radio, for example first radio 102 of wireless network 100. At step 1002, first radio 102 transmits a first control signal in a first control slot (e.g., control slot 310 or control slot 410) of a first channel (e.g., first channel 302 or first channel 402), of a frame (e.g., frame 300 or frame 400), used in wireless network 100. The first control signal includes information for data slot negotiation. That is, the first control signal includes an identification of one or more data slots (e.g., data slots 314 of frame 300 or data slots 412 of frame 400), to be reserved by first radio 102 for transmission of one or more data signals.

At step 1004, which first radio 102 performs concurrently with step 1002, first radio 102 transmits or receives at least one of a first data signal and a second control signal on a second channel (e.g., second channel 304 or second channel 404). For example, first radio 102 may transmit a first data signal in a data slot 314 of second channel 304 of frame 300. Alternatively, in step 1004, first radio 102 may receive a second control signal from another radio, for example second radio 104, in a control slot 310 of frame 300 on second channel 304. Alternatively, in step 1004, first radio 102 may receive a first data signal from another radio, for example second radio 104, in a data slot, for example a data slot 412 of frame 400 on second channel 404.

A technical effect of systems and methods described herein includes at least one of: (a) transmitting, by a first radio, in a first control slot of a first channel, a first control signal comprising information for data slot negotiation; and (b) concurrently transmitting or receiving, by the first radio, at least one of a first data signal and a second control signal on a second channel.

As compared to known methods and systems for allocating resources on a wireless network, the methods and systems described herein may provide more efficient data transmission as a radio count in the wireless network increases, for example by utilizing more channels while maintaining responsiveness in the exchange of control signals among all radios in the wireless network for data slot reservation.

In conventional methods for allocating resources on a wireless network, data efficiency is in accordance with the following equation: $E=(D*Y)/(U*Y)=1-(C/U)$, wherein X=a number of radios in the wireless network, D=a number of data slots per TDMA frame in one channel, C=a number of control slots per TDMA frame in one channel, U=(C+D)=a number of total slots per TDMA frame in one channel, and Y=a number of channels in the wireless network. The network data efficiency does not improve as the number of channels increases or decreases. The data efficiency, however, depends on the number of control slots in a TDMA frame. Since each radio is assigned a distinct control slot for exchange of "request" and "grant" messages (i.e., control signals), C is less than or equal to X. In the case that C is equal to X, all radios are assigned their respective control slots in a single TDMA frame and data efficiency $E=1-(X/U)$.

If C is less than X, it takes more than one TDMA frame for all radios to exchange "request" and "grant" messages (i.e., control signals), thus prolonging data slot reservation time and decreasing an overall responsiveness of the wireless network to data slot utilization.

In the systems and methods described herein, data efficiency, E, is also calculated using $(D*Y)/(U*Y)=1-(C/U)$. However, because control slots can be assigned concurrently in all channels, the number of available data slots in a wireless network is $(U*Y)-X$. As such, all radios are assigned control slots in a single TDMA frame, thereby maintaining responsiveness of data slot utilization in the wireless network. The resulting data efficiency, E, is thus equal to $1-(X/(U*Y))$. As long as $U*Y$ is greater than X (i.e., the number of total slots in Y channels is larger than radio count), data efficiency, E, is greater than zero. This is facilitated by using multiple channels (Y) or increasing the total number of slots in a TDMA frame, or both.

The methods and systems described herein are not limited to the specific implementations described herein, but rather, components of the systems and/or steps of the methods may be utilized independently and separately from other components and/or steps described herein.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for allocating resources in a wireless network utilized by at least a first radio and a second radio, the wireless network comprising at least a first channel and a second channel, the first channel being partitioned into control slots and data slots and the second channel being partitioned into at least data slots, the method comprising:
   transmitting, on the first channel in accordance with a first bandwidth, a first carrier frequency and a first frequency spectrum location, using the first radio, in a first control slot of the first channel, a first control signal comprising information for data slot negotiation; and
   concurrently transmitting or receiving, on the second channel in accordance with a second bandwidth, a second carrier frequency and a second frequency spectrum location, using the first radio, at least one of a first data signal or a second control signal on the second channel, wherein at least one of the first carrier frequency is different than the second carrier frequency, the first bandwidth is different than the second bandwidth, and the first frequency spectrum location is non-contiguous with the second frequency spectrum location.

2. The method of claim 1, wherein each of the first channel and the second channel is partitioned into control slots and data slots, and wherein concurrently transmitting or receiving, by the first radio, at least one of a data signal or control signal on the second channel comprises concurrently receiving, by the first radio, a second control signal comprising information for data slot negotiation, the second control signal being transmitted by the second radio in a first control slot of the second channel.

3. The method of claim 2, wherein the wireless network is utilized by a third radio and a fourth radio, the method further comprising:
   receiving, by the first radio, a third control signal comprising information for data slot negotiation transmitted using the third radio in a second control slot of the first channel; and
   concurrently receiving, using the first radio, a fourth control signal transmitted by the fourth radio in a second control slot of the second channel.

4. The method of claim 1, wherein concurrently transmitting or receiving, by the first radio, at least one of a data signal or control signal on the second channel comprises concurrently receiving, using the first radio, a first data signal transmitted by the second radio in a data slot of the second channel.

5. The method of claim 1, wherein the control slots and data slots are distributed in at least a first frame, the method further comprising:
   identifying, using the first radio, the first control slot in the first frame in accordance with a pseudo-random sequence; and
   transmitting, using the first radio, the first control signal in the identified control slot.

6. The method of claim 1, wherein the control slots and data slots are distributed in at least a first frame, the method further comprising:
   identifying, using the first radio, the first data slot in the first frame in accordance with a pseudo-random sequence; and
   transmitting, using the first radio, the first data signal in the identified data slot.

7. The method of claim 1, wherein each data slot has a size and wherein:
   transmitting, using the first radio, the first control signal comprising information for data slot negotiation comprises transmitting, using the first radio, the first control signal comprising a request for a first data slot of a first size; and
   concurrently transmitting or receiving, using the first radio, at least one of the first data signal or the second control signal on the second channel comprises receiving, using the first radio, the second control signal wherein the second control signal comprises a request for a second data slot of a second size, wherein the first size is different than the second size.

8. The method of claim 1, wherein the control slots and data slots are distributed in at least a first frame and wherein transmitting, using the first radio, in the first control slot of the first channel, the first control signal comprising information for data slot negotiation comprises:
   transmitting, using the first radio, in the first control slot of the first channel, the first control signal comprising an identification of a location in the first frame for reservation of at least one data slot, wherein the identification includes a channel identification and an identification of at least one data slot in the first frame.

9. The method of claim 8, wherein transmitting the identification of at least one data slot in the first frame comprises transmitting an identification of a group of contiguous data slots in the first frame.

10. A radio for use as a first radio in a wireless network that comprises at least the first radio and a second radio, the wireless network further comprising at least a first frame comprising at least a first channel and a second channel, the first channel being partitioned into control slots and data slots and the second channel being partitioned into at least data slots, the first radio configured to:
   transmit in a first control slot of the first channel, a first control signal comprising information for data slot negotiation, wherein the first control signal includes an identification of a location in the first frame for reservation of at least one data slot, and wherein the identification includes a channel identification and an identification of at least one data slot in the first frame; and concurrently transmit or receive at least one of a first data signal or a second control signal on the second channel.

11. A radio of claim 10, wherein each channel is partitioned into control slots and data slots, and wherein the radio is further configured to concurrently transmit or receive at least one of a data signal or control signal on the second channel by concurrently receiving a second control signal comprising information for data slot negotiation, the second control signal transmitted by the second radio in a first control slot of the second channel.

12. A radio of claim 11, wherein the wireless network is additionally utilized by a third radio and a fourth radio and wherein the radio is further configured to:
receive a third control signal comprising information for data slot negotiation transmitted using the third radio in a second control slot of the first channel; and
concurrently receive a fourth control signal transmitted using the fourth radio in a second control slot of the second channel.

13. A radio of claim 10, wherein the radio is further configured to:
concurrently transmit or receive at least one of a data signal or control signal on the second channel by concurrently receiving a first data signal transmitted using the second radio in a data slot of the second channel.

14. A radio of claim 10, wherein the control slots and data slots are distributed in at least a first frame and the radio is further configured to:
identify the first control slot in the first frame in accordance with a pseudo-random sequence; and
transmit the first control signal in the identified control slot.

15. A radio of claim 10, wherein the control slots and data slots are distributed in at least a first frame and the radio is further configured to:
identify the first data slot in the first frame in accordance with a pseudo-random sequence; and
transmit the first data signal in the identified data slot.

16. A radio of claim 10, wherein each channel has a bandwidth, a carrier frequency, and a frequency spectrum location, and wherein the radio is further configured to:
transmit the first control signal by transmitting the first control signal on the first channel in accordance with a first bandwidth, a first carrier frequency, and a first frequency spectrum location; and
concurrently transmit or receive at least one of the first data signal or the second control signal by transmitting or receiving at least one of the first data signal or the second control signal on the second channel in accordance with a second bandwidth, a second carrier frequency, and a second frequency spectrum location,
wherein at least one of the first bandwidth is different than the second bandwidth, the first carrier frequency is different than the second carrier frequency, or the first frequency spectrum location is non-contiguous with the second frequency spectrum location.

17. A radio of claim 10, wherein each data slot has a size and wherein the radio is further configured to:
transmit the first control signal comprising information for data slot negotiation by transmitting the first control signal comprising a request for a first data slot of a first size; and
receive the second control signal wherein the second control signal comprises a request for a second data slot of a second size, wherein the first size is different than the second size.

18. A radio of claim 10, further configured to transmit the identification of at least one data slot in the first frame by transmitting an identification of a group of contiguous data slots in the first frame.

19. A non-transitory computer-readable storage device having computer-executable instructions embodied thereon for facilitating allocation of resources in a wireless network utilized by at least a first radio and a second radio, the wireless network comprising at least a first frame comprising at least a first channel and a second channel, the first channel being partitioned into control slots and data slots and the second channel being partitioned into at least data slots, wherein when executed by the first radio, the computer-executable instructions cause the first radio to:
transmit in a first control slot of the first channel, a first control signal comprising information for data slot negotiation, wherein the first control signal includes an identification of a location in the first frame for reservation of at least one data slot, and wherein the identification includes a channel identification and an identification of at least one data slot in the first frame; and
concurrently transmit or receive at least one of a first data signal or a second control signal on the second channel.

* * * * *